US012623973B2

(12) United States Patent
Kubota et al.

(10) Patent No.: US 12,623,973 B2
(45) Date of Patent: May 12, 2026

(54) CERAMIC MATRIX COMPOSITE AND METHOD FOR MANUFACTURING SAME

(71) Applicants: IHI Aerospace Co., Ltd., Gunma (JP); Japan Aerospace Exploration Agency, Chofu (JP)

(72) Inventors: Yuki Kubota, Tokyo (JP); Michimasa Uda, Tokyo (JP); Haruhiko Soeda, Tokyo (JP); Takuya Aoki, Chofu (JP)

(73) Assignee: IHI AEROSPACE CO., LTD., Gunma (JP)

( * ) Notice: Subject to any disclaimer, the term of this patent is extended or adjusted under 35 U.S.C. 154(b) by 136 days.

(21) Appl. No.: 18/038,277

(22) PCT Filed: Dec. 3, 2021

(86) PCT No.: PCT/JP2021/044514
§ 371 (c)(1),
(2) Date: May 23, 2023

(87) PCT Pub. No.: WO2022/118963
PCT Pub. Date: Jun. 9, 2022

(65) Prior Publication Data
US 2024/0002296 A1 Jan. 4, 2024

(30) Foreign Application Priority Data

Dec. 4, 2020 (JP) ................................. 2020-201595

(51) Int. Cl.
*C04B 35/80* (2006.01)
*C04B 35/628* (2006.01)
*C04B 35/64* (2006.01)

(52) U.S. Cl.
CPC ........ *C04B 35/80* (2013.01); *C04B 35/62886* (2013.01); *C04B 35/62892* (2013.01);
(Continued)

(58) Field of Classification Search
CPC ............ C04B 35/62892; C04B 35/195; C04B 35/571; C04B 35/80; C04B 35/62886;
(Continued)

(56) References Cited

U.S. PATENT DOCUMENTS 3,850,689 A * 11/1974 Basche ................. C01B 32/977
65/448
2004/0022956 A1 2/2004 Patrick et al.
(Continued)

FOREIGN PATENT DOCUMENTS

CN 102795871 A 11/2012
CN 103304249 A 9/2013
(Continued)

OTHER PUBLICATIONS

Lu, et al "Preparation of co-deposited C/C—ZrC composites by CLVD process and its properties", Journal of Alloys and Compounds 686 (2016) pp. 823-830. (Year: 2016).*
(Continued)

*Primary Examiner* — Katherine A Bareford
(74) *Attorney, Agent, or Firm* — Volpe Koenig

(57) ABSTRACT

Provided is a method for manufacturing a ceramic matrix composite including a matrix and reinforcing fibers provided in the matrix. The method includes infiltrating a fiber body with powder of a ceramic material that becomes a part of the matrix. The fiber body is constituted by the reinforcing fibers. The method includes arranging, in a liquid material for the matrix, the fiber body infiltrated with the powder. The method includes heating the fiber body in this state, thereby bringing the liquid material into a film-boiling state such that ceramic derived from the liquid material is generated as a part of the matrix in the fiber body.

7 Claims, 7 Drawing Sheets

(52) U.S. Cl.
CPC ........ C04B 35/62894 (2013.01); C04B 35/64 (2013.01); *C04B 2235/3826* (2013.01); *C04B 2235/386* (2013.01); *C04B 2235/5244* (2013.01); *C04B 2235/5436* (2013.01); *C04B 2235/616* (2013.01); *C04B 2235/667* (2013.01)

(58) Field of Classification Search
CPC .............. C04B 35/64; C04B 35/62894; C04B 2235/3813; C04B 2235/3418; C04B 2235/605; C04B 2235/616; C04B 2235/3826; C04B 2235/5244; C04B 2235/3463; C04B 2235/3262; C04B 2235/667; C04B 2235/486; C04B 2235/5248; C04B 2235/5436; C04B 2235/441; C04B 2235/3217; C04B 2235/3839; C04B 2235/422; C04B 2235/3244; C04B 2235/386; C04B 2235/483

See application file for complete search history.

(56) References Cited

U.S. PATENT DOCUMENTS

| | | | |
|---|---|---|---|
| 2010/0272923 A1 | 10/2010 | Fillion | |
| 2019/0185384 A1* | 6/2019 | Shim | C04B 35/657 |
| 2020/0031722 A1* | 1/2020 | Uda | C23C 16/325 |

FOREIGN PATENT DOCUMENTS

| | | | | |
|---|---|---|---|---|
| EP | 3505502 A1 * | 7/2019 | | C04B 35/565 |
| JP | 2004-513053 A | 4/2004 | | |
| JP | 2004-213935 | * | 7/2004 | |
| JP | 2006-347837 A | 12/2006 | | |
| JP | 2010-255174 A | 11/2010 | | |
| JP | 2017-001912 A | 1/2017 | | |
| WO | 2018/168400 A1 | 9/2018 | | |

OTHER PUBLICATIONS

Extended European Search Report issued on Apr. 22, 2024 for European Patent Application No. 21900712.7.
Qinchuan, H., et al., "Microstructure, mechanical and anti-ablation properties of SiCnw/PcY core-shell networks reinforced C/C—ZrC—SiC composites fabricated by a multistep method of chemical liquid-vapor deposition", Article, Ceramics International, (2018).
Deng, H., "Densification behavior and microstructure of carbon/carbon composites prepared by chemical vapor infiltration from xylene at temperatures between 900 and 1250° C.", Northwestern Polytechnical University, China (2011).
Japanese Office Action issued on Jun. 7, 2024 for Japanese Patent Application No. 2022-567007.
Yamauchi, H., et al., "Development of Low-Cost C/C and CMC using a Film-Boiling Process," Tanso, (2018).
International Preliminary Report on Patentability issued on Jun. 15, 2023 for PCT International Application No. PCT/JP2021/044514.
C. Besnarda et al. "Synthesis of hexacelsian barium aluminosilicate by film boiling chemical vapour process", Journal of the European Ceramic Society 40 (2020) 3494-3497.
Masanori Shimizu et al. "Crystallization Behavior and Change in Surface Area of Alkoxide-Derived Mullite Precursor Powders with Different Compositions", Journal of the Ceramic Society of Japan 105 [2] 131-135 (1997).
Takesi Nakamura et al, "Development of CMC Nozzle", IHI Engineering Review, vol. 48 No.3 (Sep. 2008).
Min Mei et al. "Preparation of C/SiC composites by pulse chemical liquid-vapor deposition process", Materials Letters 82 (2012) 36-38.
Yamauchi, Hiroshi, et al., "Development of Low-Cost C/C and CMC using a Film-Boiling Process," Journal of IHI technologies, 2017, vol. 57, No. 2, pp. 53-63, ISSN: 1882-3041.

* cited by examiner

10 μm

| | POWDER PARTICLE SIZE ($\mu$m) | TREATMENT CONDITION | DENSITY AFTER FB TREATMENT (g/cm³) | DENSITY INCREASE AMOUNT (g/cm³) | POWDER EFFECT |
|---|---|---|---|---|---|
| (1) | NO POWDER | 1000°C × 8 TIMES<br>1100°C × 4 TIMES<br>1200°C × 2 TIMES | 1.86 | 0.76 | 1 |
| (2) | 5.5 | 1000°C × 3 TIMES<br>1100°C × 3 TIMES<br>1200°C × 6 TIMES | 2.14 | 1.05 | 1.4 |
| (3) | 11.5 | 1000°C × 8 TIMES<br>1100°C × 4 TIMES<br>1200°C × 2 TIMES | 2.17 | 1.07 | 1.4 |
| (4) | 11.5 | 1000°C × 8 TIMES<br>1100°C × 4 TIMES<br>1200°C × 2 TIMES | 2.00 | 0.90 | 1.2 |
| (5) | 17.0 | 1000°C × 8 TIMES<br>1100°C × 4 TIMES<br>1200°C × 2 TIMES | 2.04 | 0.95 | 1.2 |
| (6) | 17.0 | 1000°C × 8 TIMES<br>1100°C × 4 TIMES<br>1200°C × 2 TIMES | 1.93 | 0.83 | 1.1 |
| (7) | 5.5+17.0 | 1200°C×14 TIMES | 2.21 | 1.11 | 1.5 |

FIG. 8

CERAMIC MATRIX COMPOSITE AND METHOD FOR MANUFACTURING SAME

TECHNICAL FIELD

The present invention relates to a ceramic matrix composite and a method for manufacturing the same.

BACKGROUND ART

A ceramic matrix composite is a composite that includes ceramic as a matrix, and reinforcing fibers provided in the matrix. Examples of the ceramic includes silicon carbide. The ceramic matrix composites are used as high-temperature structural members in rocket engines, aircraft jet engines, and the like.

The matrix is formed on the reinforcing fibers (i.e., a fiber body that is, for example, a woven or knitted fabric of the reinforcing fibers) by a method of chemical vapor impregnation (CVI), polymer impregnation of pyrolysis (PIP), metal melt infiltration (MI), or the like. The fiber body is also called a preform.

In the CVI method, a reactive gas is caused to flow through a heated fiber body, and a reactant consequent on the reactive gas is deposited as a matrix in pores in the fiber body. In the PIP method, a fiber body is impregnated with a polymer such as polycarbosilane, and the impregnation polymer is burned to form a matrix. In the MI method, a powder material (e.g., powder of silicon carbide or carbon) is made to be contained in an inside of a fiber body, and then, a melted metal component (e.g., metallic silicon) is caused to flow into the fiber body so that a matrix (e.g., the matrix of silicon carbide and metallic silicon) is formed.

Patent Literature 1 and Non-Patent Literatures 1 and 2 describe techniques related to a part of the embodiment of the present application.

CITATION LIST

Patent Literatures

Patent Literature 1: JP2017-1912A
Patent Literature 2: CN102795871A

Non-Patent Literatures

Non-Patent Literature 1: C. Besnarda et al. "Synthesis of hexacelsian barium aluminosilicate by film boiling chemical vapour process", Journal of the European Ceramic Society 40 (2020) 3494-3497
Non-Patent Literature 2: Masanori SHIMIZU et al. "Crystallization Behavior and Change in Surface Area of Alkoxide-Derived Mullite Precursor Powders with Different Compositions", Journal of the Ceramic Society of Japan 105 [2] 131-135 (1997)
Non-Patent Literature 3: Takesi Nakamura et al, "Development of CMC Nozzle", IHI Engineering Review, Vol. 48 No. 3 (2008-9)
Non-Patent Literature 4: Min Mei et al. "Preparation of C/SiC composites by pulse chemical liquid-vapor deposition process", Materials Letters 82 (2012) 36-38

SUMMARY OF INVENTION

Technical Problem

The above-described PIP method, CVI method, and MI method have respective problems. The PIP method and the CVI method require a long time for forming a high-density matrix, which causes an increase in cost. The MI method enables a high-density matrix to be formed in a relatively short time, but metal remains in it, and the metal causes a decline in heat resistance and oxidation resistance.

For this reason, a technique of combining the respective methods has been proposed. For example, the CVI method and the PIP method are combined, or the CVI method, the powder infiltration, and the PIP method are combined, so that a processing period can be shortened to ⅓ (Non-Patent Literature 3).

A film boiling method has been proposed (Patent Literature 2 and Non-Patent Literature 4). The film boiling method enables a matrix to be formed at a speed 50 times or more faster than that in processing of the CVI method alone. According to the conventional film boiling method, a formation speed of the matrix is high, but densification is insufficient.

In view of the above, an object of the present invention is to provide a technique that aims at maximizing an advantageous effect of a film boiling method, and can form a high-density matrix in a short time, using the film boiling method, in a method for manufacturing a ceramic matrix composite.

Solution to Problem

In order to accomplish the above-described abject, a method according to the present invention is a method for manufacturing a ceramic matrix composite including a matrix and reinforcing fibers provided in the matrix, the method including:

- a step (A) of infiltrating a fiber body with powder of a ceramic material that becomes a part of the matrix, the fiber body being constituted by the reinforcing fibers;
- a step (B) of arranging, in a liquid material for the matrix, the fiber body infiltrated with the powder,
- a step (C) of heating the fiber body in a state where the fiber body is arranged in the liquid material, thereby bringing the liquid material into a film-boiling state such that ceramic derived from the liquid material is generated as a part of the matrix in the fiber body.

Advantageous Effects of Invention

According to the present invention, in the case of using a film boiling method, powder infiltration is combined with it. Thereby, an effect of the film boiling method is maximized, and a high density is achieved in a short time. In a film boiling method, when a fiber body includes large pores, such pores are not sufficiently charged with a matrix, regardless of the same level of a porosity. As a result, the pores remains as a factor of a density decline. Meanwhile, the inventors of the present application have found that pores can be charged with a matrix in a short time on the condition that the pores are small sized. Based on it, the fiber body is infiltrated with powder of a ceramic material in advance such that pores are each divided into smaller pores. Then, a matrix is formed by the film boiling method. Thereby, a high density can be achieved in a short time.

BRIEF DESCRIPTION OF DRAWINGS

FIG. 8 is a table representing respective results when the manufacturing method is implemented in changed conditions.

DESCRIPTION OF EMBODIMENTS

The following describes an embodiment of the present invention with reference to the drawings. The same reference sign is allocated to each of the corresponding parts in the respective drawings, and duplicate description is omitted.

A manufacturing method according to an embodiment of the present invention is a method for manufacturing a ceramic matrix composite that includes reinforcing fibers (a fiber body formed of reinforcing fibers) and a matrix. This method includes performing powder infiltration, thereby dividing each of larger pores in the fiber body into smaller pores so that a high-density matrix can be formed at a high speed in a film boiling method. The ceramic matrix composite includes the matrix, and a large number of the reinforcing fibers that are provided as reinforcing members in the matrix. The ceramic matrix composite may be one used as a high-temperature structural member in a rocket engine, an aircraft jet engine, or the like.

The matrix may be formed of ceramic. The matrix may be formed of silicon carbide for example, but may be formed of any (e.g., mullite) of other materials.

Each of the reinforcing fibers may be a fiber whose main component is silicon carbide or carbon. For example, the reinforcing fibers are silicon carbide fibers or carbon fibers. However, according to the present invention, the reinforcing fibers are not limited to these, and may be heat-resistant oxide fibers such as alumina fibers, mullite fibers, or zirconia fibers. The reinforcing fibers may be provided, in the matrix, as the fiber body formed of a large number of the reinforcing fibers. The fiber body may be a woven or knitted fabric of the reinforcing fibers. The fiber body may be in a state where the matrix is partially formed therein by the CVI method, the PIP method, or the like, but a large number of pores still remain therein.

Figure 1:
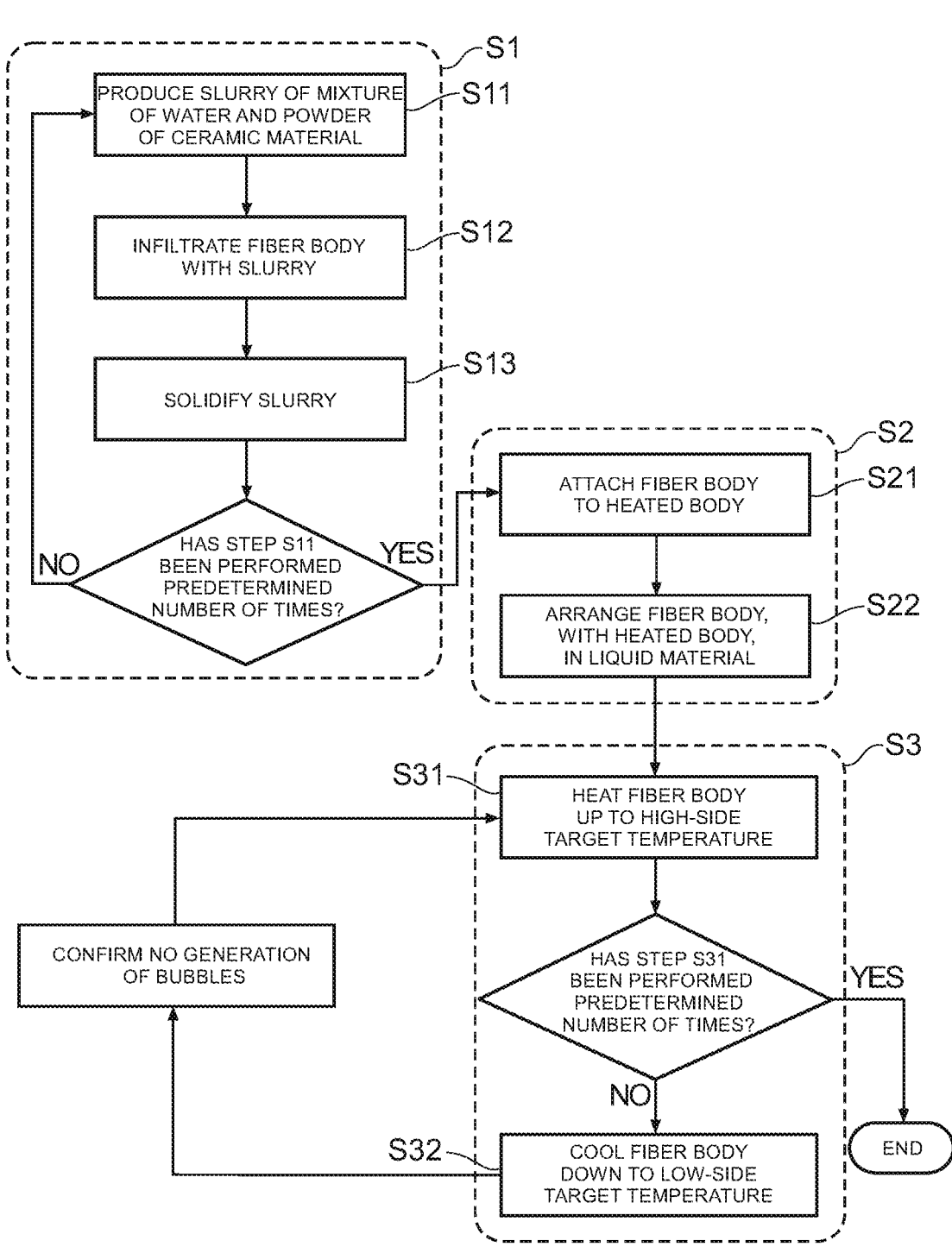
FIG. 1 is a flowchart illustrating a method for manufacturing a ceramic matrix composite according to a first embodiment of the present invention.

FIG. 1 is a flowchart illustrating the method for manufacturing the ceramic matrix composite according to an embodiment of the present invention.

At a step S1, the above-described fiber body formed of a large number of the reinforcing fibers is infiltrated with powder (hereinafter, simply referred to also as powder) of a ceramic material. The powder may be already burned powder. The powder may be powder (SiC powder) of silicon carbide as one example, but may be powder of other materials described later. The fiber body used at the step S1 may be one in which a matrix has been partially formed by the CVI method, the PIP method, or the like, as described above. In this case, the matrix may be already formed partially in one or both of an inside and a surface of the fiber body. The step S1 may include steps S11 to S13.

The powder used at the step S1 has a median diameter (a particle size at a cumulative height of 50%) equal to or larger than 1 μm and equal to or smaller than 20 μm. In this case, in one example, the powder used at the step S1 may be mixed powder in which powder having a median diameter of 5 μm and powder having a median diameter of 17 μm are mixed with each other. In this case, in one example, a volume fraction (=weight fraction) of the powder having a median diameter of 5 μm to the entire powder used at the step S1 is 35%.

Alternatively, particles (that constitutes at least 70%, at least 80%, or at least 90% of the entire powder) that constitute the powder used at the step S1 may each have a particle size equal to or larger than 1 μm and equal to or smaller than 20 μm. The powder used at the step S1 may be constituted by particles having one sort of particle sizes, or may be constituted by particles having a plurality of sorts of different particle sizes. In the former case, a main part (that constitutes at least 70%, at least 80%, or at least 90% of the entire powder) of the powder used at the step S1 may consists of particles each having a particle size of approximately 5 μm (e.g., equal to or larger than 3 μm or equal to or smaller than 7 μm). In the latter case, a main part (that constitutes at least 70%, at least 80%, or at least 90% of the entire powder) of the powder used at the step S1 may consist of particles each having a particle size of approximately 5 μm (e.g., equal to or larger than 3 μm and equal to or smaller than 7 μm), and particles each having a particle size of approximately 17 μm (e.g., equal to or larger than 15 μm and equal to or smaller than 19 μm). In this latter case, the particles each having a particle size of approximately 5 μm and particles each having a particle size of approximately 17 μm may each constitute at least 40% of the powder used at the step S1.

The particle size (a length from one end to an opposite end) of each particle may mean the maximum size of the particle (the maximum size among sizes in all directions).

At the step S11, slurry is produced by mixing the powder of the ceramic material with a liquid (dispersion medium) such as water.

At the step S12, the fiber body is placed in a slurry vessel (not illustrated) inside which the slurry produced at the step S11 is held. At this time, the entire fiber body is made to be buried in the slurry. At the step S12, inside gas of the slurry vessel is evacuated through a suction pipe connected to the slurry vessel (a gas phase portion inside the vessel). This promotes charging of the slurry into the pores of the fiber body.

At the step S13, the fiber body infiltrated with the slurry at the step S12 is taken out from the slurry vessel and heated by a suitable heating device to evaporate the liquid from the slurry in the fiber body. Thereby, only the liquid is evaporated from the slurry. As a result, the powder remains inside the fiber body.

After the step S13, the above-described step S11 may be started again, and the steps S11 to S13 may be repeated. After the steps S11 to S13 are repeated a predetermined number of times, the sequence proceeds to a step S2. The predetermined number of times may be equal to or larger than two times and equal to or smaller than ten times (e.g., may be five times). For example, the predetermined number of times is two times, the fiber body is heated at 80° C. for 30 minutes at the step S13 of the first time, and the fiber body is heated at 130° C. for 30 minutes to 60 minutes at the step S13 of the second time. The steps S11 to S13 do not need to be repeated. In this case, after the steps S11 to S13 are performed once, the sequence proceeds to the step S2.

At the step S2, the fiber body (the fiber body that holds the powder inside) infiltrated with the powder of the ceramic material at the step S1 is arranged in a liquid material for the matrix. The liquid material used at the step S2 is the below-described ceramic material for the matrix of the ceramic matrix composite. This liquid material may be, for example, a liquid polycarbosilane (LPCS) that is a liquid material for silicon carbide. However, the liquid material is not limited to this as described below.

At the step S2, the above-described fiber body is attached to a heated body by an attachment tool, and the fiber body is arranged in the liquid material for the matrix, together with the heated body. In a state where the fiber body is attached to the heated body by the attachment tool, the fiber body may be in contact with or in non-contact with the heated body.

The step S2 includes steps S21 and S22. At the step S21, the above-described fiber body is attached to the heated body by the attachment tool. Thereby, the fiber body and the heated body may be integrally coupled to each other. The number of the fiber bodies thus attached to the heated body may be one or plural (two in the example of FIG. 2A described below).

Figure 2A:
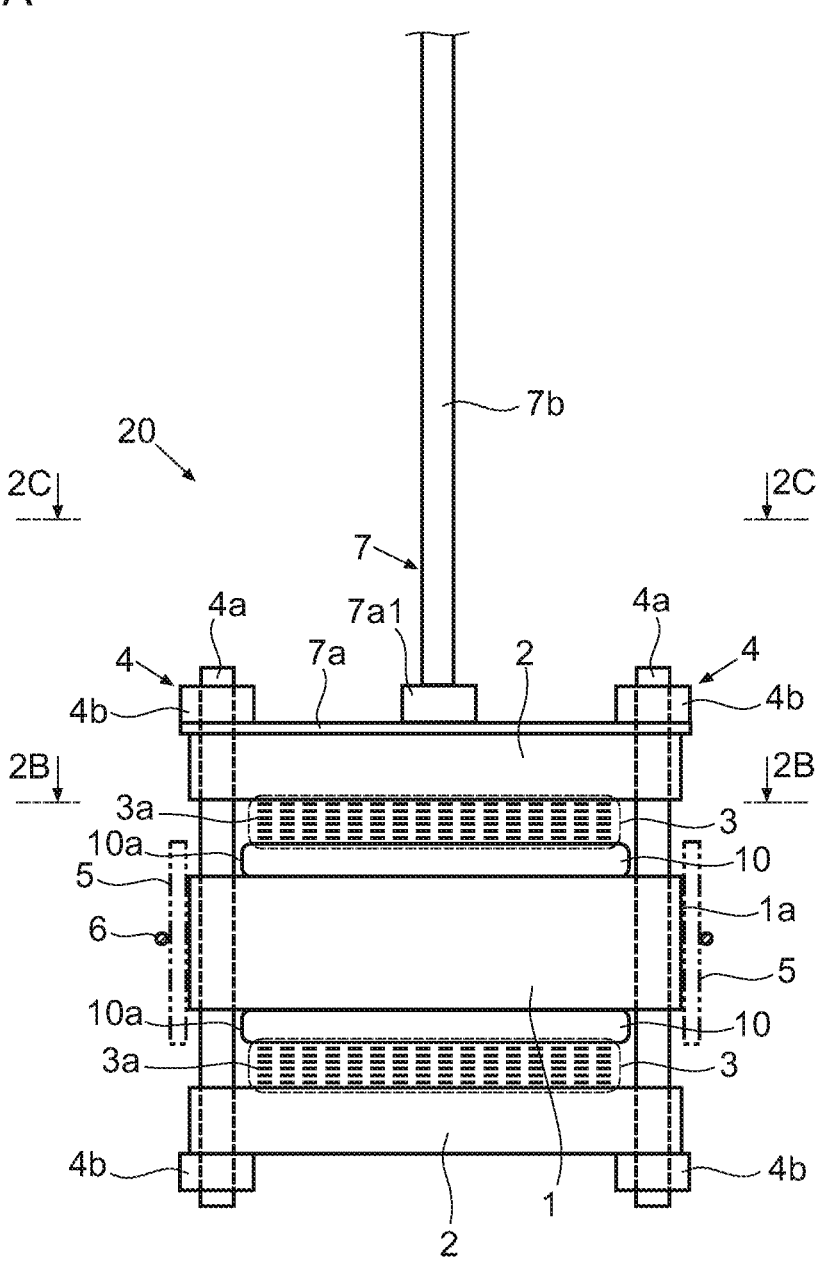
FIG. 2A illustrates one example of an attachment tool that can be used in the manufacturing method according to the embodiment of the present invention.

FIG. 2A illustrates one example of the attachment tool that can be used at the step S21. However, the attachment tool is not limited to the configuration example in FIG. 2A, and may be any attachment tool that maintains the state where the fiber body is attached to the heated body.

Figure 2B:
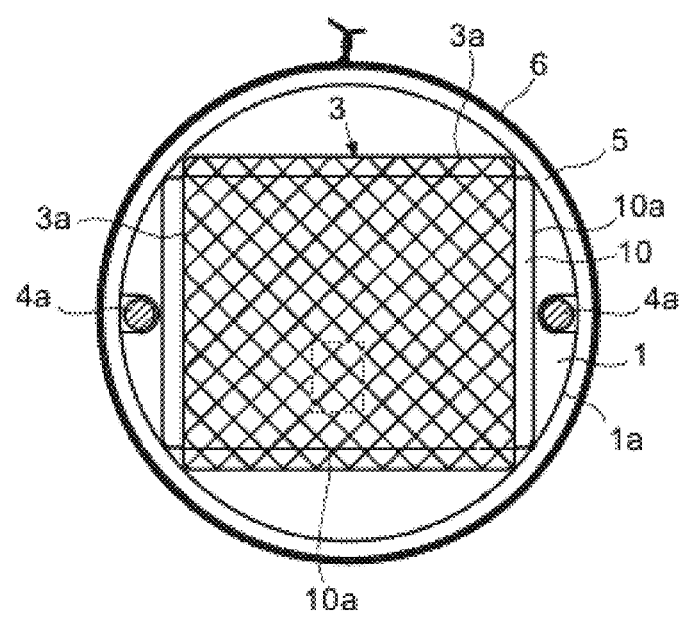
FIG. 2B is an arrow view taken along the line 2B-2B in FIG. 2A.

In the case of FIG. 2A, at the step S21, the above-described fiber body 10 is attached to the heated body 1 by the attachment tool 20. FIG. 2B is an arrow view taken along the line 2B-2B in FIG. 2A. FIG. 2A illustrates the state (hereinafter, simply referred to also as an attached state) where the two fiber bodies 10 having been subjected to the treatment at the step S1 are attached to the heated body 1 by the attachment tool 20 so as to contact with an upper surface and a lower surface of the heated body 1. The attachment tool 20 includes a pair of heat insulating plates 2, porous bodies 3, an acting mechanism 4, a heat insulating member 5, and a suspension unit 7.

The heated body 1 is formed of a material (e.g., graphite) that can be induction-heated. The heated body 1 is arranged between a pair of the heat insulating plates 2. The heat insulating plates 2 are each formed of a material (e.g., alumina) having a heat insulating property. When viewed in a thickness direction of the heat insulating plates 2, the heat insulating plates 2 and the heated body 1 may have, for example, respective circular shapes having approximately the same radius. In the above-described attached state, the porous body 3 is arranged between the heated body 1 and each of the heat insulating plates 2. The porous bodies 3 each include a large number of holes through which fluid can pass. The porous bodies 3 may be each a plurality of wire nets superimposed on each other, for example.

The acting mechanism 4 includes a bolt 4a and nuts 4b. The bolt 4a penetrates through the two heat insulating plates 2 and the heated body 1 such that a gap exists between the bolt 4a and each of the heat insulating plates 2 and the heated body 1. The nuts 4b are screwed onto both end portions of the bolt 4a. In the attached state, the nuts 4b are tightened on the bolt 4a in a direction of shifting the two heat insulating plates 2 to each other. Thereby, the respective porous bodies 3, the heated body 1, and the fiber bodies 10 are held between a pair of the heat insulating plates 2. A plurality of (in the example of FIG. 2A, two) acting mechanisms 4 described above may be provided.

The heat insulating member 5 covers outer peripheries of the heated body 1 and the two fiber bodies 10 in the attached state. In other words, the heated body 1 and the fiber bodies 10 have respective outer peripheries 1a and 10a that surround the central axis oriented in a thickness direction of the heat insulating plates 2. These outer peripheries 1a and 10a are covered with the heat insulating member 5, as illustrated in FIG. 2B. In FIG. 2A, only portions of the heat insulating member 5 are illustrated by the two-dotted chain lines. These portions are located on both sides (the left and right sides in this drawing) of the heated body 1 and the respective fiber bodies 10. The heat insulating member 5 is formed of a material having a heat insulating property. For example, the heat insulating member 5 may be a heat insulating cloth (fabric) made of glass. In order to fix the heat insulating member 5 to the heated body 1, a wire 6 is wound around the heat insulating member 5 from an outer peripheral thereof in the example of FIG. 2A and FIG. 2B. However, the heat insulating member 5 may be fixed to the heated body 1 by another means.

The respective porous bodies 3 are exposed to an outer peripheral side thereof in the attached state. In other words, the porous bodies 3 each include an outer periphery 3a surrounding the central axis oriented in the thickness direction of the heat insulating plates 2, and the outer periphery 3a is exposed to an outside in a radial direction with respect to the central axis.

Figure 2C:
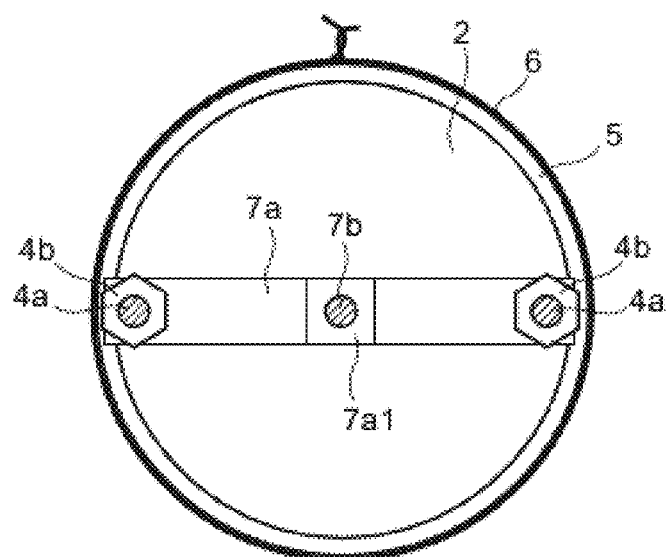
FIG. 2C is an arrow view taken along the line 2C-2C in FIG. 2A.

The suspension unit 7 is provided for suspending the fiber body 10 and the heated body 1 at the below-described step 22. FIG. 2C is an arrow view taken along the line 2C-2C in FIG. 2A. The suspension unit 7 includes a plate-shaped member 7a and a rod-shaped member 7b. The plate-shaped member 7a is elongated, in the left-right direction in FIG. 2A and FIG. 2C, along an upper surface of the upper-side heat insulating plate 2. The bolts 4a penetrate through both end portions of the plate-shaped member 7a such that a gap exists between the plate-shaped member 7a and each of the bolts 4a. The both end portions of the plate-shaped member 7a are each sandwiched between the upper-side heat insulating plate 2 and the upper-side nut 4b. The plate-shaped member 7a is provided with a coupling portion 7a1 at a central portion of the plate-shaped member 7a. The rod-shaped member 7b is coupled to the coupling portion 7a1. The rod-shaped member 7b extends upward from the coupling portion 7a1. For example, the coupling portion 7a1 may include a protrusion as a bolt on an upper surface of the coupling portion 7a1, and a bolt hole may be formed on a lower end surface of the rod-shaped member 7b, which is not illustrated. In this case, the bolt is screwed into the bolt hole, and thereby, the coupling portion 7a1 and the rod-shaped member 7b are coupled to each other.

Figure 3:
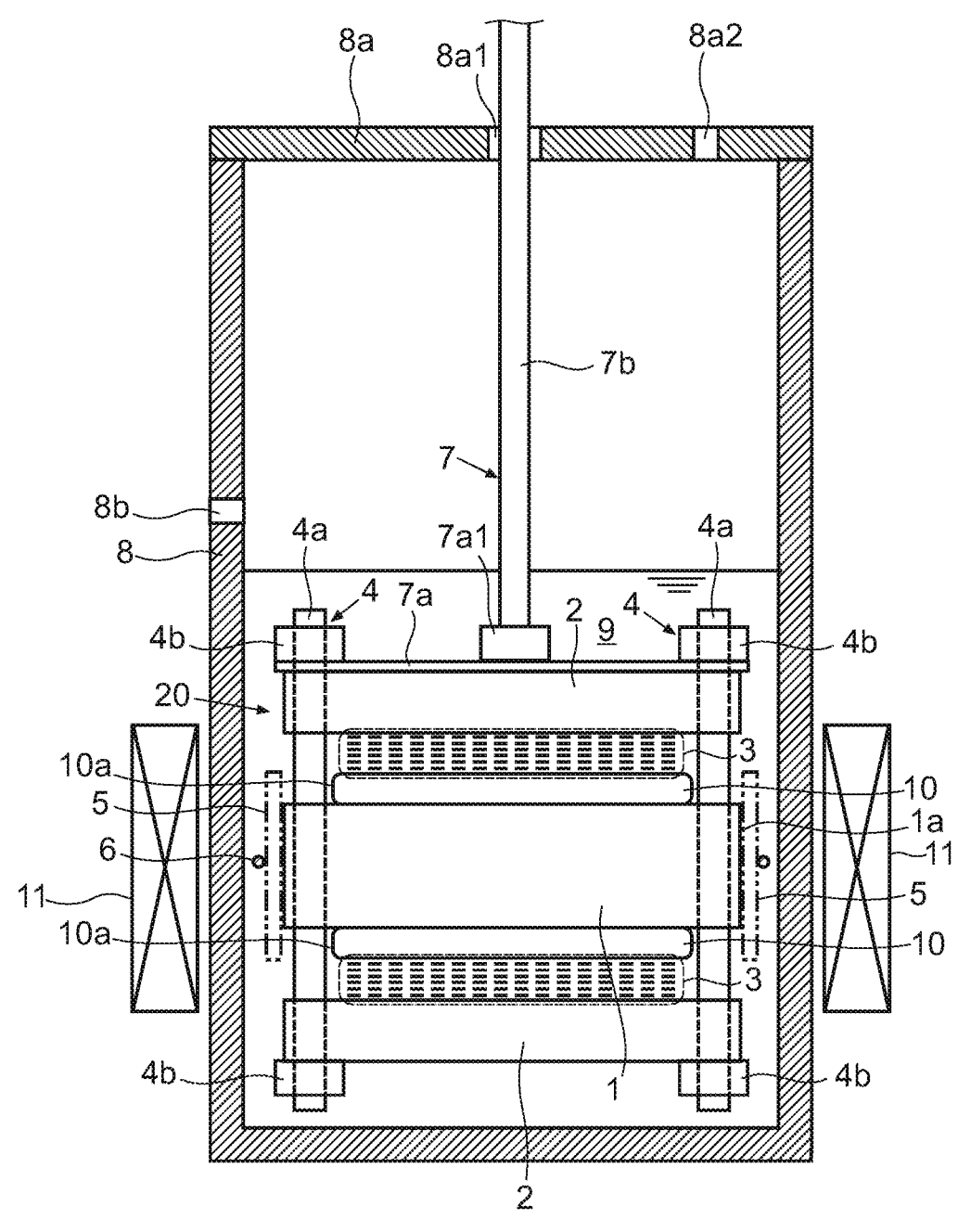
FIG. 3 illustrates an example of a configuration that can be used for implementing a film boiling method in the manufacturing method according to the embodiment of the present invention.

At the step S22, as illustrated in FIG. 3, the fiber bodies 10 attached to the heated body 1 by the attachment tool 20 are arranged in the liquid material 9 in a treatment vessel 8. At this time, the fiber bodies 10 are arranged in the liquid material 9 while the fiber bodies 10 and the heated body 1 are suspended by the suspension unit 7 such that the attachment tool 20, the heated body 1, and the fiber bodies 10 do not contact with inner surfaces (a bottom surface and an inner peripheral surface) of the treatment vessel 8. At this time, the rod-shaped member 7*b* of the suspension unit 7 may be arranged so as to penetrate through a penetration hole 8*a*1 of a cover member 8*a* that closes an opening of an upper surface of the treatment vessel 8. An upper-end-side portion of the rod-shaped member 7*b* may be coupled to an unillustrated structure by an appropriate means so as to be supported by the structure.

At the step S22, the suspension unit is not limited to the configuration example illustrated in FIG. 2A, FIG. 2C, and the like as long as the suspending unit can suspend the fiber body 10 and the heated body 1 such that the attachment tool 20, the heated body 1, and the fiber body 10 do not contact with (i.e., are separated from) the inner surfaces of the treatment vessel 8.

The treatment vessel 8 is made of a non-electroconductive material (e.g., glass) that cannot be induction-heated. The treatment vessel 8 includes a gas introduction hole 8*b* formed for introducing nitrogen gas into a gas phase portion in the treatment vessel 8 at the below-described step S3. The treatment vessel 8 includes a gas discharge hole 8*a*2 formed for discharging gas from the gas phase portion in the treatment vessel 8 at the step S3.

By the step S22, the entire fiber body is located within the liquid material. As a result, the liquid material enters (permeates into) the respective pores (the respective pores open to an outside of the fiber body) in the fiber body infiltrated with the powder at the step S1. When the step S22 is ended, the sequence proceeds to the step S3.

At the step S3, a matrix is formed in the fiber body by the film boiling method. Thereby, the ceramic matrix composite is produced. The step S3 includes steps S31 and S32.

At the step S31, the reinforcing fibers are heated until a temperature of the reinforcing fibers (fiber body) becomes equal to or higher than a high-side target temperature. Thereby, ceramic derived from the liquid material is generated in the pores in the fiber body infiltrated with the powder. Thereby, a matrix including the ceramic and the powder that are integrated with each other is formed.

The following describes the formation of the ceramic at the step S31, in more detail. At the step S31, the liquid material is heated by the heated fiber body and the powder on the fiber body, and thereby turns into a film-boiling gas (i.e., is brought into a film-boiling state) at an interface between the liquid material and the fiber body or the powder (inner surfaces of the pores inside the fiber body). The ceramic (i.e., thermally decomposed precipitates as the ceramic) is generated from the thus-generated film-boiling gas so as to be deposited in the pores. This ceramic may result from one or both of the following events (i) and (ii).

(i) The film-boiling gas collides with the inner surfaces of the pores, and thus, further receives thermal energy. Thereby, the film-boiling gas proceeds to be thermally decomposed and become inorganic, resulting in the solid ceramic precipitated on the inner surfaces of the pores.

(ii) A gas included in a part of the film-boiling gas has already been thermally decomposed. This thermally decomposed gas collides with the heated inner surfaces of the pores, and thereby proceeds to become inorganic, resulting in the solid ceramic precipitated on the inner surfaces of the pores.

At the step S31, the ceramic may be precipitated also on an interface between an outer surface of the fiber body and the liquid material.

The heating at the step S31 may be performed by induction-heating the heated body. For example, as illustrated in FIG. 3, alternating current is caused to flow through a coil 11, and thus, the coil 11 generates an alternating magnetic field. The alternating magnetic field causes the heated body 1 to be induction-heated. The heated body 1 is thus heated to generate heat that heats the fiber body and the liquid material. When a temperature of the fiber body (reinforcing fibers) becomes the high-side target temperature at the step S31, the sequence proceeds to the step S32. For example, when a temperature measured by a temperature sensor attached to the surface of the heated body becomes equal to or higher than the high-side target temperature, the sequence proceeds to the step S32. The high-side target temperature is a temperature higher than a boiling point of the liquid material. A temperature rising rate of the fiber body (or the heated body) at the step S31 is desirably equal to or lower than 3000° C./hour, equal to or lower than 2000° C./hour, or equal to or lower than 1500° C./hour. In this case, the temperature rising rate may be equal to or higher than 500° C./hour. In this case, the temperature rising rate is more desirably approximately 1000° C./hour, or equal to or lower than 1000° C./hour. However, the temperature rising rate is not limited to this. For example, the temperature rising rate may be lower than 500° C./hour (in this case, the temperature rising rate may be equal to or higher than 100° C./hour, for example).

When the heated body 1 is induction-heated at the step S31 as described above, the treatment vessel 8 formed of the non-electroconductive material is not induction-heated. At this time, as illustrated in FIG. 3, the suspension unit 7 suspends the heated body 1, the fiber body 10, and the attachment tool 20 so as not to contact with the inner surfaces of the treatment vessel 8. Thus, the treatment vessel 8 is prevented from being broken by contacting with the heated body 1, the fiber body 10, and the attachment tool that are at a high temperature.

At the step S32, the fiber body is cooled until a temperature of the fiber body becomes another target temperature lower than the boiling point of the liquid material. Thereby, the generation of the above-described film-boiling gas is stopped. As a result, in a state where the film-boiling gas phenomenon is stopped and a new film-boiling gas is not generated, the already generated film-boiling gas is replaced with the liquid material. Thereby, in the fiber body, the liquid material once more enters (permeates into) each pore of which entirety has not been filled with the ceramic. For example, at the step S32, the liquid material once more enters each pore of which only part has been filled with the ceramic at the step S31. A temperature lowering rate of the heated body (or the fiber body) at the step S32 may be, for example, a naturally cooled speed or a positively cooling speed as described below.

The cooling at the step S32 may be natural cooling that is caused as a result of stopping the heating of the fiber body and maintaining this stopped state. Alternatively, at the step S32, the liquid material may be positively cooled in addition to stopping the heating of the fiber body. For example, in FIG. 3, a part of the liquid material 9 in the treatment vessel 8 may be caused to flow to an outside of the treatment vessel 8, and may be cooled by a heat exchanger. Then, the cooled liquid material 9 may be returned to an inside of the treatment vessel 8. In this manner, the cooled liquid material 9 may be circulated. In this case, piping, a pump, and the like (not illustrated) may be provided for circulating the liquid material 9 in such a manner.

When a temperature of the fiber body at the step S32 becomes the target temperature lower than the boiling point of the liquid material by cooling the ceramic matrix composite, the step S31 is restarted. For example, a temperature measured by the above-described temperature sensor is regarded as a temperature of the fiber body, and when the measured temperature becomes equal to or lower than the target temperature, the step S31 is restarted. This target temperature may be used as an approximate indication. In other words, it can be difficult to restart the step S31 at a timing when a temperature of the fiber body becomes the target temperature. For this reason, a timing of restarting the step S31 may be a timing when a temperature of the fiber body becomes the target temperature, or may be a timing when a temperature of the fiber body declines from the target temperature to some extent.

After the step S32, before the restart of the step S31, it is confirmed that bubbles are not generated, from the fiber body, in the liquid material in the treatment vessel. After this confirmation is made, the step S31 is restarted. This confirmation may be made, for example, by visually recognizing, from an outside, an inside of the transparent treatment vessel made of glass. It can be determined from no generated bubbles that the liquid material has completely permeated into an inside of the fiber body.

The step S31 is restarted in such a manner, and the step S31 and the step S32 are repeated. Thereby, the ceramic grows in each pore in the matrix. Thus, these pores are charged with the ceramic. The step S31 and the step S32 are repeated until each pore is sufficiently charged with the ceramic (e.g., each pore is completely filled with the ceramic). The number of times of this repetition may be, for example, equal to or larger than 10 and equal to or lower than 20, but is not limited to this range.

In the repetition of the step S31 and the step S32, the target temperature at the step S31 performed in a later stage may be higher than the target temperature at the step S31 performed in an earlier stage. In this case, the target temperature at the step S31 may be increased in a plurality of stages (e.g., in three or more stages) during the above-described repetition. For example, in the above-described repetition, the target temperature may be 1000° C. at the step S31 (e.g., the step S31 of each of the first to third times) in the first stage, may be 1100° C. at the step S31 (e.g., the step S31 of each of the fourth to sixth times) in the intermediate stage, and may be 1200° C. at the step S31 (e.g., the step S31 of each of the seventh to twelfth times) in the last stage.

When the liquid material is LPCS described above, the above-described ceramic is silicon carbide. In this case, the boiling point of LPCS rises from approximately 180° C. to approximately 250° C. as polymerization thereof progresses in the course of the repetition of the step S31 and the step S32. In this case, the maximum reached temperature of the fiber body at the step S31 is equal to or higher than 800° C. for example, and is desirably equal to or higher than 1000° C. and equal to or lower than 1400° C. When the maximum temperature is equal to or higher than 1000° C., sufficient progress of conversion into the inorganic ceramic can be expected. When the maximum temperature is equal to or lower than 1400° C., it is possible to prevent a speed of precipitation of the ceramic from becoming too high, and prevent occurrence of severe thermal decomposition that results in undeposition of the ceramic. Thus, it can be expected to facilitate the charging of the pores with the ceramic.

Embodied Example 1

In an embodied example 1 of the present embodiment, the fiber body is one formed of SiC fibers (silicon carbide fibers)

as reinforcing fibers, and the liquid material is LPCS described above. The above-described steps represented in the flowchart of FIG. 1 were performed using the configuration illustrated in FIG. 2A to FIG. 2C and FIG. 3.

Figure 4:
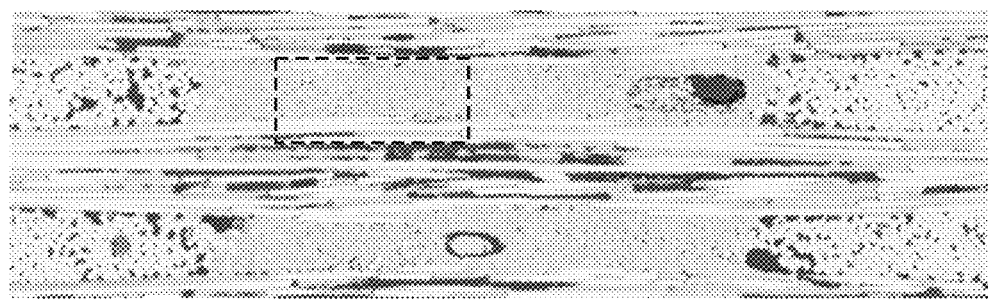
FIG. 4 is an image acquired by a scanning electron microscope and concerning a section of a ceramic matrix composite produced by an embodied example of the present invention.
Figure 5:
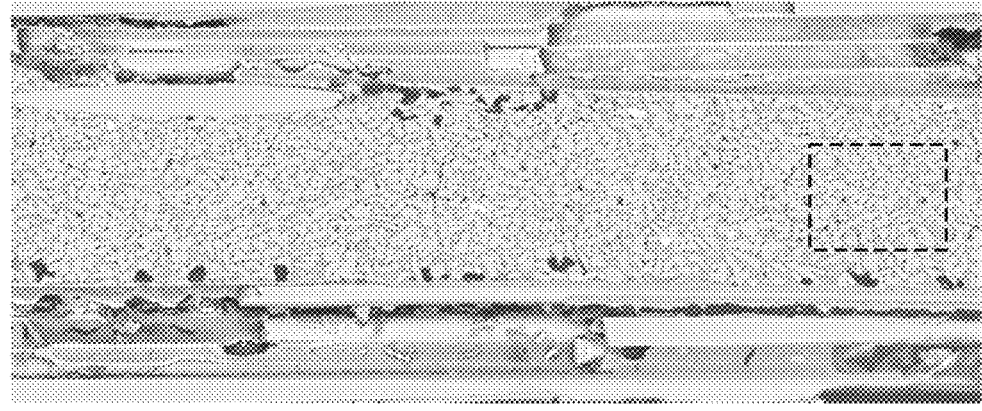
FIG. 5 is an enlarged view of a portion surrounded by the dashed line in FIG. 4.
Figure 6:
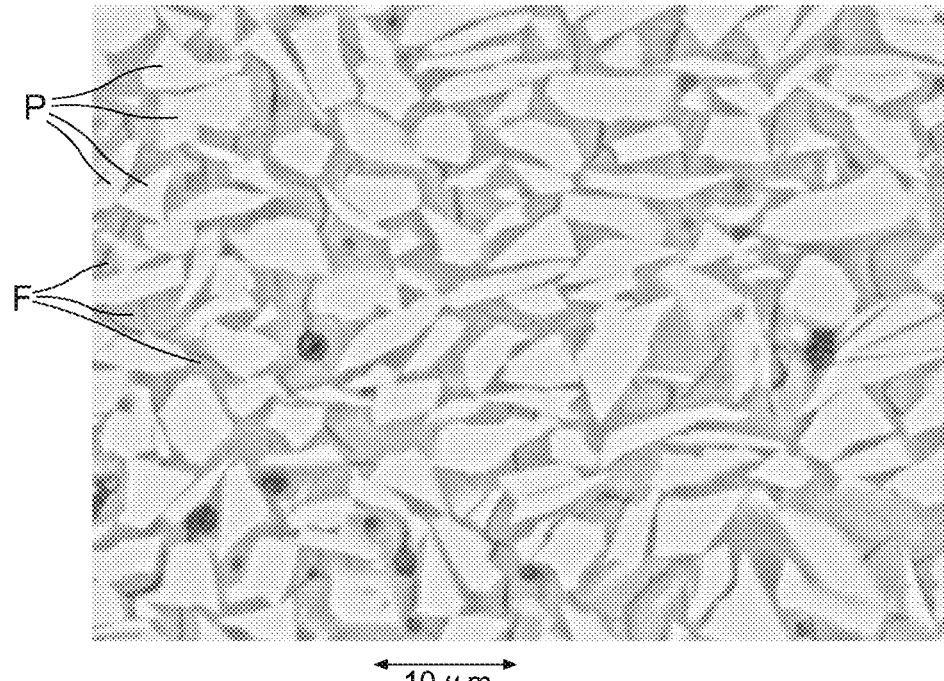
FIG. 6 is an enlarged view of a portion surrounded by the dashed line in FIG. 5.

FIG. 4 is an image of a section of a ceramic matrix composite produced by the embodied example 1. The image was acquired by a scanning electron microscope. FIG. 5 is an enlarged view of a portion surrounded by the dashed line in FIG. 4. FIG. 6 is an enlarged view of a portion surrounded by the dashed line in FIG. 5. In FIG. 6, the reference sign P indicates the powder of the ceramic material used at the step S1, and the reference sign F indicates the ceramic formed by the film boiling method at the step S3.

Figure 7:
FIG. 7 is an image acquired by a scanning electron microscope and concerning a section of a ceramic matrix composite produced by a reference example.

FIG. 7 is an image of a section of a ceramic matrix composite produced by a reference example. The image was acquired by a scanning electron microscope. In this reference example, the above-described steps S2 and S3 were performed without performing the above-described step S1. The other matters in the reference example are the same as those in the embodied example 1. The image in FIG. 7 is an image of the same magnification as that in FIG. 4.

In the reference example, as illustrated in FIG. 7, large pores (pores of several hundred micrometers) that are not charged with a matrix remain inside the ceramic matrix composite (in the case of the reference example, in order to charge the large pores, it is desirable to increase the number of times of performing the above-described steps S31 and S32). In contrast to this, according to the embodied example 1, as illustrated in FIG. 4 to FIG. 6, relatively large pores such as those illustrated in FIG. 7 do not remain inside the ceramic matrix composite, and thus, a charge rate of the matrix inside the ceramic matrix composite is high.

In the embodied example 1, as illustrated in FIG. 6, fine pores (of several micrometers) between particles of the powder P are charged with the ceramic F generated at the above-described step S31. Accordingly, it can be understood that the matrix constituted by the powder P and the ceramic F is formed inside the fiber body at a high charge rate in the present embodiment.

Embodied Example 2

In the embodied example 2, the treatment illustrated in the flowchart in FIG. 1 was performed for a plurality of changed particle sizes of the powder of the ceramic material used at the step S1. FIG. 8 is a table representing results of the embodied example 2.

In FIG. 8, (1) indicates the case of a reference example in which the above-described steps S2 and S3 are performed without performing the above-described step S1. The other matters in the reference example are the same as those in the embodied example 2. In FIGS. 8, (2) to (7) indicate the cases of the embodied example 2. Note that (3) and (4) indicate the respective cases of the ceramic matrix composites produced simultaneously on a lower side and an upper side of the heated body 1 in FIG. 3, and (5) and (6) indicate the respective cases of the ceramic matrix composites produced simultaneously on a lower side and an upper side of the heated body 1 in FIG. 3.

In FIG. 8, "powder particle size" indicates a particle size of particles constituting the powder used at the step S1, and in this example, is a particle size (median diameter) at a cumulative height of 50%. The sign (7) indicates the case of using, as the powder at the step S1, mixed powder in which powder of particles with the particle size of 5.5 μm is mixed with powder of particles with the particle size of 17.0 μm.

In FIG. 8, "treatment condition" indicates how many times the fiber body was heated up to each temperature in repetition of the above-described steps S31 and S32. For example, in (2), the fiber body is heated up to 1000° C. at the step S31 of the first time to the third time, the fiber body is heated up to 1100° C. at the step S31 of the fourth time to the sixth time, and the fiber body is heated up to 1200° C. at the step S31 of the seventh time to the twelfth time.

In FIG. 8, "density after FB treatment" indicates a density of the ceramic matrix composite manufactured as a result of finishing the treatment in FIG. 1. Further, "density increase amount" indicates an increase amount of a density of the ceramic matrix composite compared to a density of the fiber body, and "powder effect" indicates a ratio of the density increase amount in each case to a density increase amount concerning the case (1) and regarded as "1".

As understood from FIG. 8, in each of the cases (2) to (7) where the fiber body is infiltrated with the powder, the density increases compared to the case (1) where the fiber body is not infiltrated with the powder. The highest value of "powder effect" was achieved in the case (2) of 5.5 μm as the particle size among the cases (2) to (6) in each of which the powder of particles with one sort of the particle size was used.

In the case (7) of using the mixed powder in which powder of the particle size of 5.5 μm is mixed with powder of the particle size of 17.0 μm, "powder effect" is even higher than that in the case (2). In other words, the highest powder effect was achieved by using the mixed powder in which the powder of the particle size of approximately 5 μm is mixed with the powder of the particle size of approximately 17.0 μm.

The present invention is not limited to the above-described embodiment, and of course, various modifications can be made within the scope of the technical idea of the present invention. For example, any of the following modified examples 1 to 4 may be adopted, or two or more of the modified examples 1 to 4 may be arbitrarily combined and adopted. In this case, the matters that are not described below may be the same as those described above.

Modified Example 1

The powder used at the above-described step S1 is the powder of silicon carbide in the above, but may be powder of any of other ceramic materials.

The powder may be powder of boron nitride (BN) that is ceramic. Boron nitride has low adhesion to silicon carbide. Thus, when the ceramic generated from the liquid material at the above-described step S31 is silicon carbide, or when the reinforcing fibers are silicon carbide fibers, crack propagation can be suppressed at an interface between a portion of boron nitride and a portion of silicon carbide in the matrix.

Alternatively, the powder may be carbon powder. In this case, the carbon powder achieves a function of suppressing crack propagation, similarly to the case of the above-described powder of boron nitride.

The powder may be powder of one of silicon dioxide ($SiO_2$) and alumina ($Al_2O_3$) each of which is less expensive than silicon carbide.

The powder may be powder of mullite ($Al_2O_3$—$SiO_2$) whose heat resistance is higher than that of alumina and that is less expensive than silicon carbide.

The powder may be powder of zirconia ($ZrO_2$). Zirconia is ceramic having a melting point higher than that of silicon carbide, and thus functions as a part of the matrix without melting even in an environment of an ultra-high temperature.

The powder may be powder of zirconium carbide (ZrC), hafnia ($HfO_2$), hafnium carbide (HfC), zirconium boride ($ZrB_2$), or hafnium boride ($HfB_2$). Such powder has a function similar to that of the zirconia powder.

The powder may be mixed powder of powder of alumina and powder of manganese oxide (MnO). In this case, when oxygen enters a crack formed in the matrix, oxygen reacts with silicon carbide (silicon carbide generated as the ceramic by the film boiling method at the step S3) in the matrix so that silicon dioxide is generated. This silicon dioxide reacts with alumina so as to be charged in the crack. Manganese oxide activates such charging in the crack.

Modified Example 2

The liquid material used at the above-described step S3 may be a liquid material other than LPCS described above. For example, the liquid material may be borazine, methyltrichlorosilane, cyclohexane, a silicon alkoxide solution, an aluminum alkoxide solution, a mixture of a silicon alkoxide solution and an aluminum alkoxide solution, or a zirconium alkoxide solution.

When the liquid material is borazine, the ceramic formed by the heating at the step S31 is boron nitride (BN) that is ceramic. A function of this boron nitride is similar to that described in the modified example 1.

When the liquid material is methyltrichlorosilane, the ceramic formed by the heating at the step S31 is silicon carbide (SiC) that is ceramic, as in the case where the liquid material is liquid polycarbosilane (LPCS).

When the liquid material is cyclohexane, the ceramic formed by the heating at the step S31 is carbon. This carbon has a function similar to that in the case of boron nitride.

When the liquid material is the silicon alkoxide solution, the ceramic formed by the heating at the step S31 is silicon dioxide. The silicon alkoxide solution is less expensive than LPCS.

When the liquid material is the aluminum alkoxide solution, the ceramic formed by the heating at the step S31 is alumina. The aluminum alkoxide solution is less expensive than LPCS.

When the liquid material is the mixture of the silicon alkoxide solution and the aluminum alkoxide solution, the ceramic formed by the heating at the step S31 is mullite.

When the liquid material is the zirconium alkoxide solution, the ceramic formed by the heating at the step S31 is zirconia. A function of this zirconia is similar to that described in the modified example 1.

According to the present invention, the liquid material used at the step S3 is not limited to the above-described specific examples, and may be any of other liquid materials. For example, any of other metal alkoxide solutions may be the liquid material used at the step S3. In this case, the ceramic formed by the heating at the above-described step S31 may be oxide ceramic. In this case, the liquid material used at the step S3 may be, for example, a mixture of three alkoxide solutions (alkoxydes) such as one described in Non-Patent Literature 1, such that the ceramic generated at the step S31 is barium aluminosilicate ($BaAl_2Si_2O_8$).

When the ceramic formed by the heating at the above-described step S31 is mullite, the liquid material used at the step S3 may be a mixture of a plurality of alkoxide solutions (alkoxydes) as described in Non-Patent Literature 2.

Modified Example 3

At the above-described step S3, the step S31 may be performed without performing the step S32. In this case, at the step S31, the fiber body is heated until a temperature of the fiber body becomes equal to or higher than the high-side target temperature, and a temperature of the fiber body is maintained at a temperature equal to or higher than the high-side target temperature for a predetermined time. This predetermined time may be, for example, equal to or longer than six hours and equal to or shorter than twenty hours.

Modified Example 4

In the above description, the heated body 1 may be omitted. In this case, the fiber body (e.g., the fiber body constituted by carbon fibers or silicon carbide fibers) infiltrated with the powder and having a sufficiently large heat capacity (volume) may be induction-heated at the step S31. Thereby, the above-described film-boiling gas may be generated so that one or both of the above-described events (i) and (ii) cause the ceramic to be deposited in the fiber body. In this case, for example in FIG. 2A and FIG. 3, the heated body 1 may be omitted, the number of the fiber bodies may be changed to one, the one fiber body 10 may contact with the porous bodies 3 on upper and lower sides thereof, the heat insulating member 5 may cover the outer periphery 10a of the fiber body 10, and the other matters may be the same as those described above. In addition to or instead of omitting the heated body 1, the heat insulating plates 2 may be omitted.

REFERENCE SIGNS LIST

1 Heated body, 1a Outer periphery, 2 Heat insulating plate, 3 Porous body, 3a Outer periphery, 4 Acting mechanism, 4a Bolt, 4b Nut, 5 Heat insulating member, 6 Wire, 7 Suspension unit, 7a Plate-shaped member, 7a1 Coupling portion, 7b Rod-shaped member, 8 Treatment vessel, 8a Cover member, 8a1 Penetration hole, 8a2 Gas discharge hole, 8b Gas introduction hole, 9 Liquid material, 10 Fiber body, 10a Outer periphery, 11 Coil, 20 Attachment tool

The invention claimed is:

1. A method for manufacturing a ceramic matrix composite including a matrix and reinforcing fibers provided in the matrix, the method comprising:

a step (A) of infiltrating a fiber body with powder of a ceramic material that becomes a part of the matrix, the fiber body being constituted by the reinforcing fibers;

a step (B) of arranging, in a liquid material for the matrix, the fiber body infiltrated with the powder; and a step (C) of heating the fiber body in a state where the fiber body is arranged in the liquid material, thereby bringing the liquid material into a film-boiling state such that ceramic derived from the liquid material is generated as a part of the matrix in the fiber body, wherein the step (C) includes:

a step (C1) of heating the fiber body, thereby bringing the liquid material into the film-boiling state such that the ceramic is generated in the fiber body;

a step (C2) of cooling the fiber body until a temperature of the fiber body becomes equal to or lower than a low-side target temperature lower than a boiling point of the liquid material; and repeating the step (C1) and the step (C2) in the state where the fiber body is arranged in the liquid material, wherein the repeating the step (C1) and the step (C2) includes:

raising the temperature of the fiber body by heating the fiber body at the step (C1);

starting the step (C2) at a timing that the temperature of the fiber body becomes equal to or higher than a high-side target temperature in course of raising the temperature of the fiber body at the step (C1);

lowering the temperature of the fiber body by cooling the fiber body at the step (C2); and starting the step (C1) again at a timing that the temperature of the fiber body becomes equal to or lower than the low-side target temperature in course of lowering the temperature of the fiber body at the step (C2).

2. The method for manufacturing the ceramic matrix composite according to claim 1, wherein:

the step (A) includes:

a step (A1) of producing slurry by mixing the powder with a liquid;

a step (A2) of burying the fiber body in the slurry in a slurry vessel; and a step (A3) of evacuating inside gas of the slurry vessel, thereby causing the fiber body to be infiltrated with the slurry including the powder.

3. The method for manufacturing the ceramic matrix composite according to claim 1, wherein:

the step (A) uses the powder having a median diameter equal to or larger than 1 μm and equal to or smaller than 20 μm.

4. The method for manufacturing the ceramic matrix composite according to claim 1, wherein:

the step (A) uses, as the powder, mixed powder in which powder having a median diameter of 5 μm and powder having a median diameter of 17 μm are mixed with each other.

5. The method for manufacturing the ceramic matrix composite according to claim 1, wherein:

the step (B) includes arranging the fiber body and a heated body inside a treatment vessel that holds the liquid material; and the step (C1) includes induction-heating the heated body, thereby heating the fiber body.

6. The method for manufacturing the ceramic matrix composite according to claim 5, wherein:

the step (C1) includes causing alternating current is caused to flow through a coil arranged outside of the treatment vessel, thereby causing the coil to generates an alternating magnetic field such that the heated body is induction-heated by the alternating magnetic field and heats the fiber body, and the treatment vessel is formed of a non-electroconductive material.

7. The method for manufacturing the ceramic matrix composite according to claim 5, wherein:

the step (B) includes: attaching the fiber body to the heated body by an attachment tool; and suspending the attachment tool, the fiber body, and the heated body so as not to contact with an inner surface of the treatment vessel.

* * * * *